(12) United States Patent
Nugent et al.

(10) Patent No.: US 11,198,390 B2
(45) Date of Patent: *Dec. 14, 2021

(54) OVERHEAD OBSTACLE DETECTION AND AVOIDANCE SYSTEM FOR VEHICLES

(71) Applicants: Frank Nugent, Irvington, NY (US); Brian Nugent, Irvington, NY (US)

(72) Inventors: Frank Nugent, Irvington, NY (US); Brian Nugent, Irvington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/090,181

(22) Filed: Nov. 5, 2020

(65) Prior Publication Data

US 2021/0129750 A1 May 6, 2021

Related U.S. Application Data

(60) Provisional application No. 62/930,628, filed on Nov. 5, 2019.

(51) Int. Cl.
*B60Q 1/00* (2006.01)
*B60Q 9/00* (2006.01)
(Continued)

(52) U.S. Cl.
CPC .............. *B60Q 9/008* (2013.01); *G08G 1/165* (2013.01); *H04L 12/40* (2013.01); *G01S 13/86* (2013.01);
(Continued)

(58) Field of Classification Search
CPC ........ B60Q 9/008; G08G 1/165; H04L 12/40; H04L 2012/40215; H04L 2012/40273;
(Continued)

(56) References Cited

U.S. PATENT DOCUMENTS

| 8,207,836 B2 * | 6/2012 | Nugent | G08G 1/165 340/435 |
| 8,212,660 B2 * | 7/2012 | Nugent | G01S 15/931 340/435 |

(Continued)

OTHER PUBLICATIONS

Young, Lee; PCT International Search Report and Written Opinion for PCT/US2020/059088; dated Feb. 2, 2021; 4 pages.

*Primary Examiner* — Toan N Pham

(57) ABSTRACT

A method for preventing the collision of a vehicle with an overhead obstacle, comprising mounting at least one sensor on a vehicle that includes a vehicle control system, wherein the sensor is in electrical communication with a processor located within and powered by the vehicle; determining a reference height, which is the height above ground level at which the at least one sensor is mounted on the vehicle; inputting the reference height into the processor; determining the height of the tallest portion of the vehicle above ground level; inputting the height of the tallest portion of the vehicle above ground level into the processor; using the sensor to measure the overhead distance between the lowest portion of an obstacle and the at least one sensor; using the processor to determine a measured height of the overhead obstacle, which is the reference height added to the distance between the overhead obstacle and the sensor; and communicating an alarm to an operator of the vehicle if the measured height of the overhead obstacle is less than the height of the tallest portion of the vehicle above ground level.

20 Claims, 6 Drawing Sheets

(51) Int. Cl.
*G08G 1/16* (2006.01)
*H04L 12/40* (2006.01)
*G01S 13/86* (2006.01)
*G01S 13/931* (2020.01)

(52) U.S. Cl.
CPC ..... *G01S 13/931* (2013.01); *G01S 2013/9324* (2020.01); *G01S 2013/93276* (2020.01); *H04L 2012/40215* (2013.01); *H04L 2012/40273* (2013.01)

(58) Field of Classification Search
CPC .................. G01S 13/86; G01S 13/931; G01S 2013/9324; G01S 2013/93276
See application file for complete search history.

(56) References Cited

U.S. PATENT DOCUMENTS

| | | |
|---|---|---|
| 2004/0183661 A1* | 9/2004 | Bowman ................ G08G 1/165 340/435 |
| 2004/0201495 A1* | 10/2004 | Lim ................ G08G 1/096758 340/905 |
| 2005/0242931 A1 | 11/2005 | Gunderson et al. |
| 2012/0081218 A1 | 4/2012 | Nugent |
| 2016/0171892 A1 | 6/2016 | Gieseke |
| 2016/0297360 A1* | 10/2016 | Smyth ...................... G08G 1/16 |
| 2017/0072764 A1 | 3/2017 | Kleve et al. |

* cited by examiner

OVERHEAD OBSTACLE DETECTION AND AVOIDANCE SYSTEM FOR VEHICLES

CROSS-REFERENCE TO RELATED APPLICATIONS

This patent application claims the benefit of U.S. Provisional Patent Application Ser. No. 62/930,628 filed on Nov. 5, 2019 and entitled "Overhead Obstacle Detection and Avoidance System", the disclosure of which is hereby incorporated by reference herein in its entirety and made part of the present U.S. utility patent application for all purposes.

BACKGROUND

The described invention relates in general to an obstacle detection and avoidance system for use with vehicles, and more specifically to an overhead obstacle detection and avoidance system that includes one more sensors in communication with a processing and control unit for determining the height of an overhead obstacle, comparing that height to the maximum height of a vehicle, warning a vehicle operator about potential hazards, and taking any necessary actions to avoid a collision.

Large trucks, tractor-trailer units, recreational vehicles, buses, tall work vans, and ambulances are commonplace in modern society and are used daily for transporting a multitude of items from one place to another. The highway system in the United States, as well as in most other countries, includes numerous bridges and overpasses that may create difficulties for the operators of large vehicles due to the fact that the height of some vehicles exceeds the clearance required to safely travel under such obstacles. If a truck, tractor-trailer unit, or other vehicle exceeds the required clearance of a bridge or overpass, and the operator of the vehicle is not able to make that determination prior to encountering the obstacle, a collision can and often does occur. These collisions typically result in extensive damage to both the vehicle and the section of the roadway involved. The operator of the vehicle, the operators of other vehicles on the affected section of road, and even pedestrians crossing a bridge or overpass may also be seriously injured or killed.

Despite the problems described above, few systems for allowing vehicles such as trucks, tractor-trailer units, or other large and/or tall vehicles to avoid collision with overhead obstacles are commercially available. Many previously developed systems are either prohibitively expensive to install, prohibitively difficult to use, or are only somewhat effective for their intended purpose. Thus, there is an ongoing need for a reliable, relatively inexpensive and easy to install detection system for allowing large (i.e., tall) vehicles to avoid costly and dangerous collisions with overhead obstacles such as bridges and overpasses.

SUMMARY

The following provides a summary of certain example embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

One implementation provides a first method for preventing the collision of a vehicle with an overhead obstacle. This method comprises mounting at least one sensor on a vehicle, wherein the vehicle includes a vehicle control system, and wherein the at least one sensor is in electrical communication with at least one processor located within the vehicle and powered by the vehicle; determining a reference height, wherein the reference height is the height above ground level at which the at least one sensor is mounted on the vehicle; inputting the reference height into the at least one processor; determining the height of the tallest portion of the vehicle above ground level; inputting the height of the tallest portion of the vehicle above ground level into the at least one processor; using the at least one sensor to measure the overhead distance between the lowest portion of an obstacle and the at least one sensor; using the at least one processor to determine a measured height of the overhead obstacle, wherein the measured height of the overhead obstacle is the reference height added to the distance between the overhead obstacle and the at least one sensor; and communicating an alarm message to an operator of the vehicle if the measured height of the overhead obstacle is less than the height of the tallest portion of the vehicle above ground level, wherein the alarm message is communicated to the operator using application software resident on a mobile device that is in communication with the processer, using an original equipment manufacturer in-cab touch screen dashboard display that is in communication with the processor, or both. The method may further comprise including a global positioning system in the at least one processor and using the global positioning system to mark the location and height of the overhead obstacle, and then using a server in communication with the global positioning system to communicate the location and height of the overhead obstacle to other vehicles that are in communication with the server. The method may further comprise using the vehicle control system to take evasive or collision-avoiding actions without intervention from the operator of the vehicle, and wherein the evasive or collision-avoiding actions include automatic application of vehicle brakes. The method may further comprise using a controller area network system (CAN bus) and the J1939 protocol to enable communication between the processor and the vehicle control system. The at least one sensor may be either an ultrasonic sensor or a radar-based sensor. The vehicle may be a truck, a semi-trailer truck, a recreational vehicle, a bus, a tall work van, an ambulance, or any other tall vehicle. The alarm message may be audible, visual, or both audible and visual.

Another implementation provides a second method for preventing the collision of a vehicle with an overhead obstacle. This method comprises mounting at least one sensor on a vehicle, wherein the vehicle includes a vehicle control system, and wherein the at least one sensor is in electrical communication with at least one processor located within the vehicle and powered by the vehicle, and wherein the at least one processor includes a global positioning system; determining a reference height, wherein the reference height is the height aboveground level at which the at least one sensor is mounted on the vehicle; inputting the reference height into the at least one processor; determining the height of the tallest portion of the vehicle above ground level; inputting the height of the tallest portion of the vehicle above ground level into the at least one processor; using the at least one sensor to measure the overhead distance between the lowest portion of an obstacle and the at least one sensor; and using the at least one processor to determine a measured height of the overhead obstacle, wherein the measured height of the overhead obstacle is the reference height added to the distance between the overhead obstacle and the at least one sensor. The method may further comprise using the global positioning system to mark the location and height of the overhead obstacle and then using a server in communication with the global positioning system to communicate the location and height of the overhead obstacle to other vehicles that are in communication with the server. The method may further comprise using the vehicle control system to take evasive or collision-avoiding actions without intervention from the operator of the vehicle, and wherein the evasive or collision-avoiding actions include automatic application of vehicle brakes. The method may further comprise communicating an alarm message to the operator of the vehicle if the measured height of the overhead obstacle is less than the height of the tallest portion of the vehicle above ground level, wherein the alarm message is communicated to the operator using application software resident on a mobile device that is in communication with the processer, using an original equipment manufacturer in-cab touch screen dashboard display that is in communication with the processor, or both. The alarm message may be audible, visual, or both audible and visual. The method may further comprise using a controller area network system (CAN bus) and the J1939 protocol to enable communication between the processor and the vehicle control system. The at least one sensor may be either an ultrasonic sensor or a radar-based sensor. The vehicle may be a truck, a semi-trailer truck, a recreational vehicle, a bus, a tall work van, an ambulance, or any other tall vehicle.

Still another implementation provides a third method for preventing the collision of a vehicle with an overhead obstacle. This method comprises mounting at least one sensor on a vehicle, wherein the vehicle includes a vehicle control system, wherein the at least one sensor is in electrical communication with at least one processor, and wherein the at least one processor is accessible by an operator of the vehicle, and wherein the at least one processor includes a global positioning system; determining a reference height, wherein the reference height is the height above ground level at which the at least one sensor is mounted on the vehicle; inputting the reference height into the at least one processor; determining the height of the tallest portion of the vehicle above ground level; inputting the height of the tallest portion of the vehicle above ground level into the at least one processor; using the at least one sensor to measure the overhead distance between the lowest portion of an obstacle and the at least one sensor; using the at least one processor to determine a measured height of the overhead obstacle, wherein the measured height of the overhead obstacle is the reference height added to the distance between the overhead obstacle and the at least one sensor; and communicating an alarm message to the operator of the vehicle if the measured height of the overhead obstacle is less than the height of the tallest portion of the vehicle above ground level, wherein the alarm message is communicated to the operator using application software resident on a mobile device that is in communication with the processer using an original equipment manufacturer in-cab touch screen dashboard display that is in communication with the processor, or both. The method may further comprise using the global positioning system to mark the location and height of the overhead obstacle and then using a server in communication with the global positioning system to communicate the location and height of the overhead obstacle to other vehicles that are in communication with the server. The method may further comprise using the vehicle control system to take evasive or collision-avoiding actions without intervention from the operator of the vehicle, and wherein the evasive or collision-avoiding actions include automatic application of vehicle brakes. The method may further comprise using a controller area network system (CAN bus) and the J1939 protocol to enable communication between the processor and the vehicle control system. The alarm message may be audible, visual, or both audible and visual. The at least one sensor may be either an ultrasonic sensor or a radar-based sensor. The vehicle may be a truck, a semi-trailer truck, a recreational vehicle, a bus, a tall work van, an ambulance, or any other tall vehicle.

Additional features and aspects of the present invention will become apparent to those of ordinary skill in the art upon reading and understanding the following detailed description of the example embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example embodiments of the invention and, together with the general description given above and detailed description given below, serve to explain the principles of the invention, and wherein.

DETAILED DESCRIPTION

Figure 1:
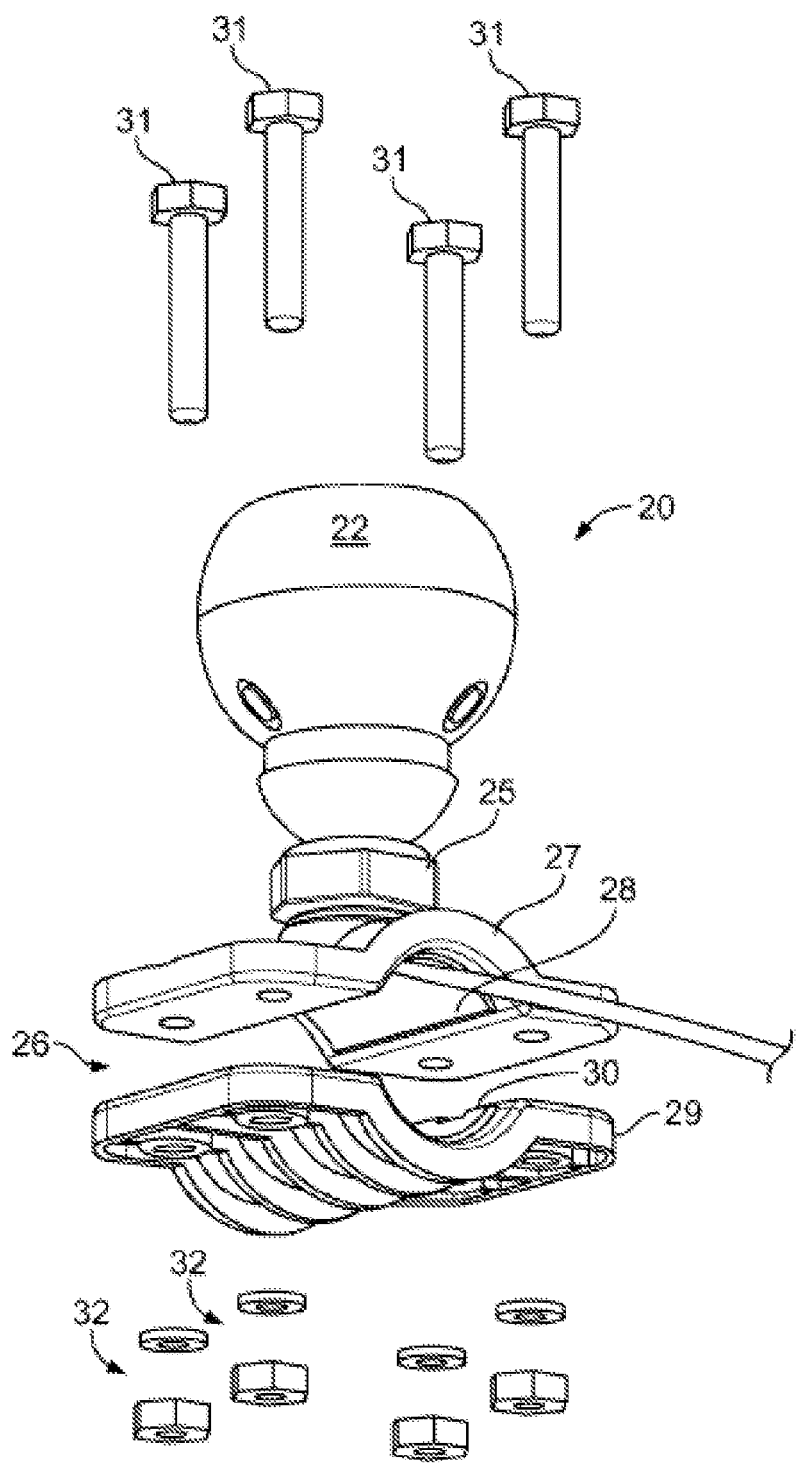
FIG. 1 is a semi-exploded view depicting the sensor assembly component of an example implementation of the disclosed obstacle detection and avoidance system.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

Disclosed implementations relate generally to systems, devices, and methods for use with large and/or tall vehicles such as trucks, tractor-trailer units, recreational vehicles, buses, tall work vans, and ambulances for detecting and avoiding stationary objects such as a bridges or overpasses located above a roadway. The disclosed obstacle detection and avoidance system is essentially a two-part system that includes a sensor component that communicates with a processing and control component. The sensor component is typically mounted on the side mirror frame of a truck, tractor-trailer unit, or other vehicle of significant size and height, although other placements are possible, such as on the hood of the vehicle near the windshield or the headlights. The control component is in electrical communication with the sensor component and can be programmed with the height of the sensor component and the height of the trailer that is being pulled or the truck that is being driven using either application software resident on a smartphone or tablet computing device or the original equipment manufacturer (OEM) in-cab touch screen display. In use, when the vehicle approaches a potential obstacle or hazard, the operator of the vehicle slowly pulls the front portion (i.e., cab) of the vehicle under the hazard and activates the disclosed overhead obstacle detection and avoidance system. The height of the obstacle relative to the height of the trailer is determined and reported to the vehicle's operator. If the obstacle is lower than an acceptable height, and alarm sounds and the operator may avoid moving any farther forward. In this manner, the vehicle's operator may avoid serious damage to the vehicle and/or the obstacle. This system addresses the problem of hazards, i.e. bridges, trestles, trees, that are unmarked or mismarked, or areas where new asphalt has been added (up to several inches) to the road bed and the height signs (i.e. 12", 12' 6") have not been changed accordingly. In some implementations, the disclosed system includes collision mitigation or avoidance aspects that include automatic responses to hazards (e.g., automatic brake engagement by the vehicle control system upon receiving information from the processor regarding a particular hazard). Variants of the disclosed obstacle detection and avoidance system are described in U.S. Pat. Nos. 8,212,660 and 8,207,836, both of which are incorporated-by-reference herein, in their entirety, for all purposes.

Figure 2:
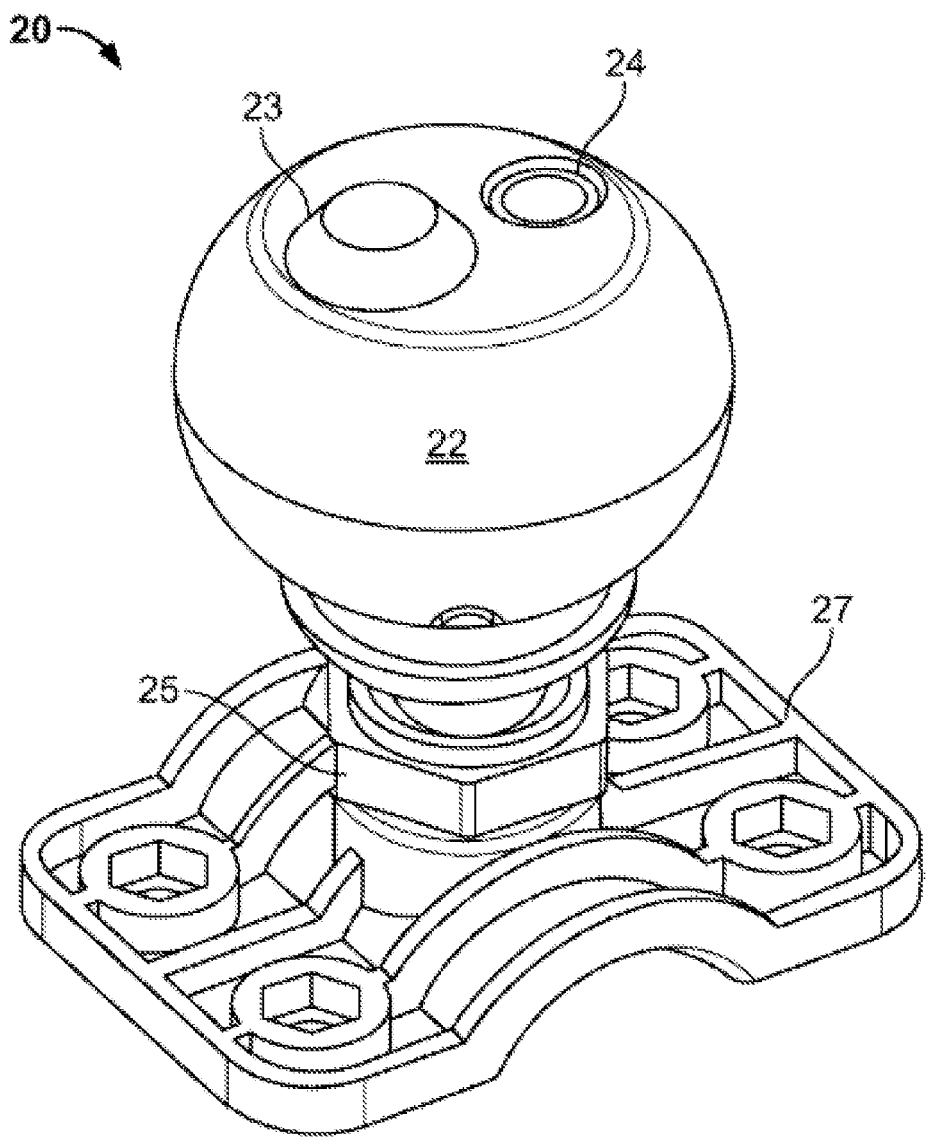
FIG. 2 is a top perspective view of the sensor assembly component of FIG. 1.
Figure 3:
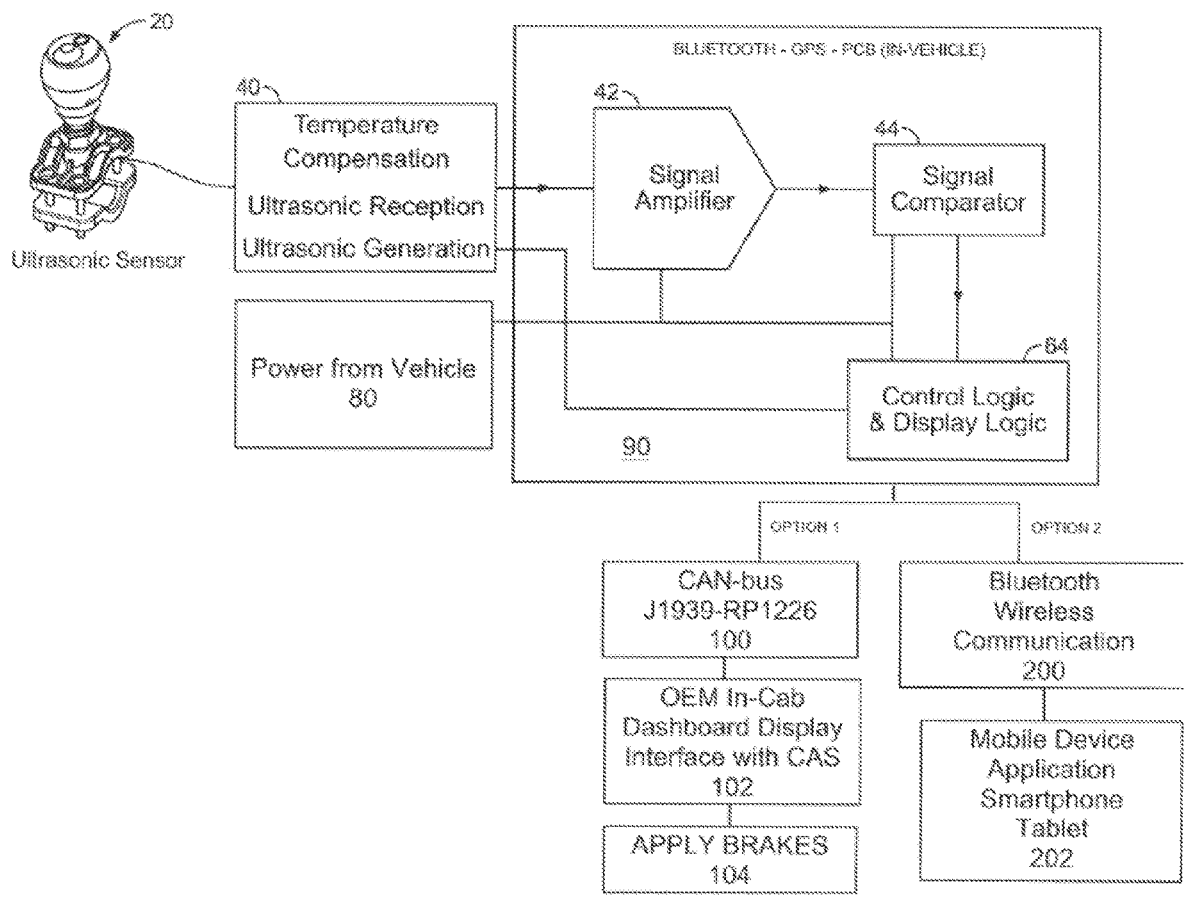
FIG. 3 is a somewhat simplified schematic depicting an example implementation of the disclosed obstacle avoidance and detection system detailing various components and certain functional aspects of the system.
Figure 4:
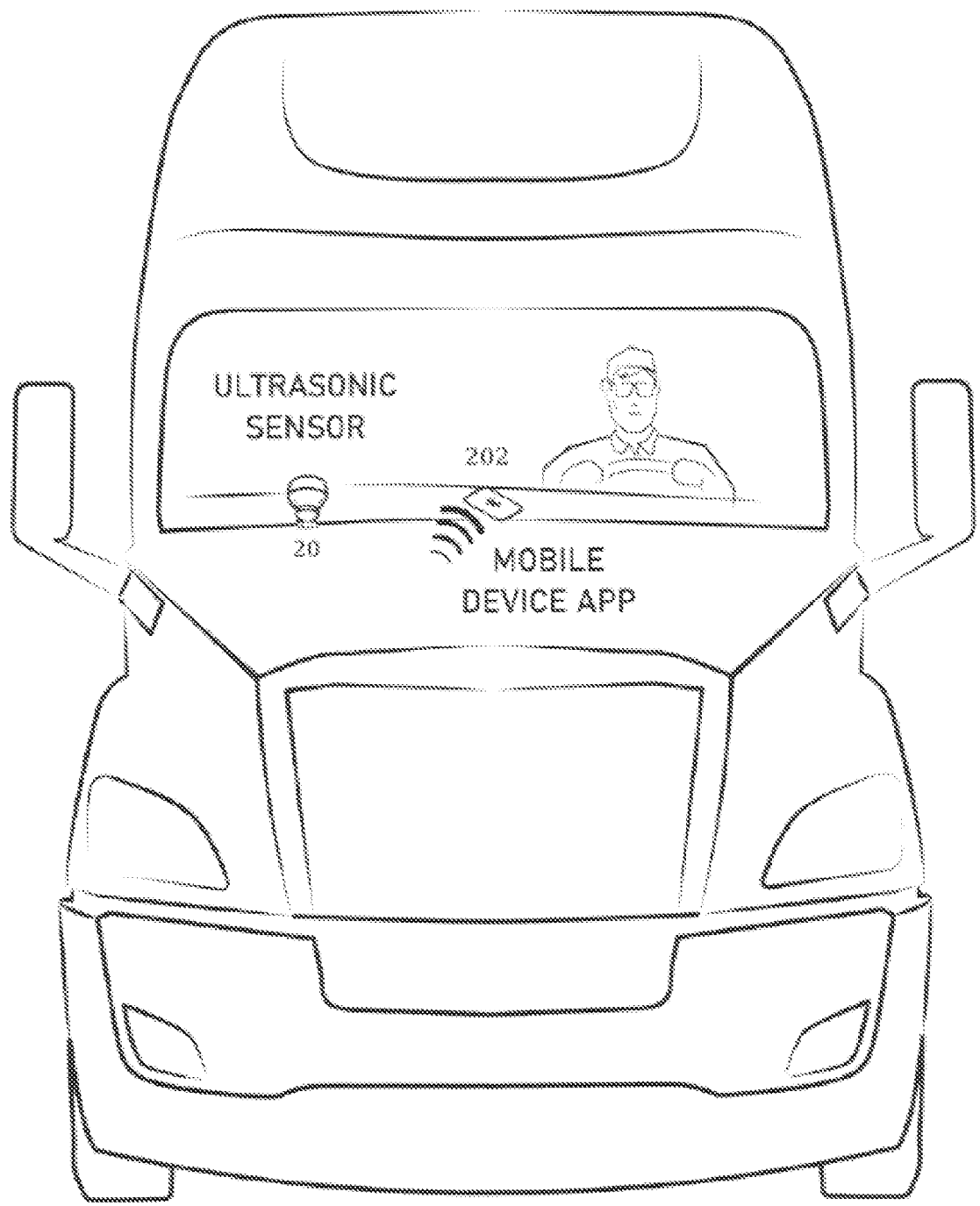
FIG. 4 depicts the sensory assembly component of the disclosed obstacle detection and avoidance system mounted outside a vehicle and communicating with the processing component of the system which is underneath the hood of the vehicle (not shown), wherein the processing component is wirelessly communicating information to the operator of the vehicle using application software resident on a mobile device.
Figure 5:
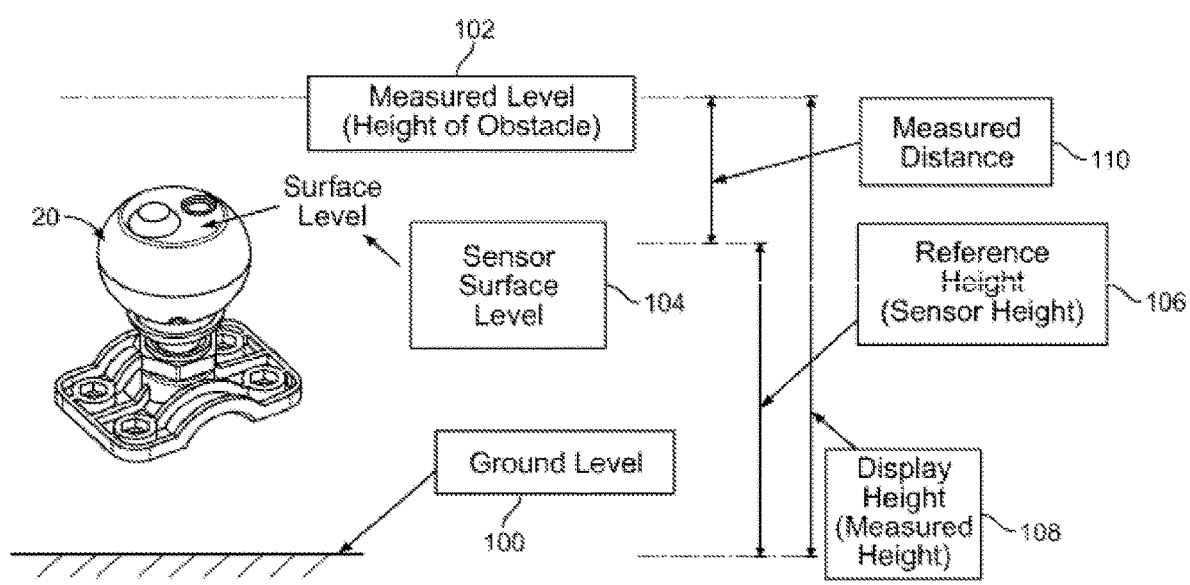
FIG. 5 is a block diagram illustrating the various heights measured and calculated by an example implementation of the disclosed obstacle detection and avoidance system.
Figure 6:
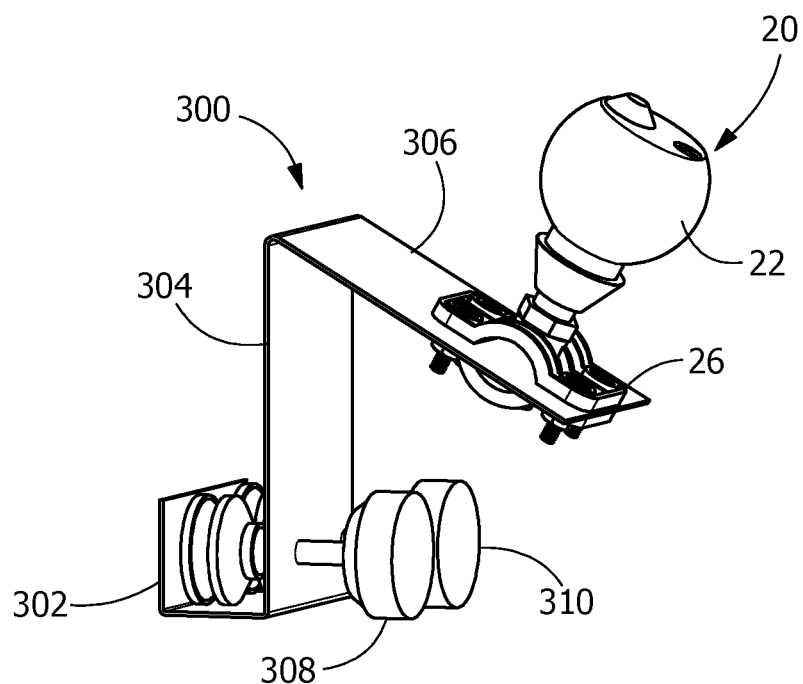
FIG. 6 depicts the sensor assembly component of the disclosed obstacle detection and avoidance system mounted on a first example implementation of a positioning clamp.
Figure 7:
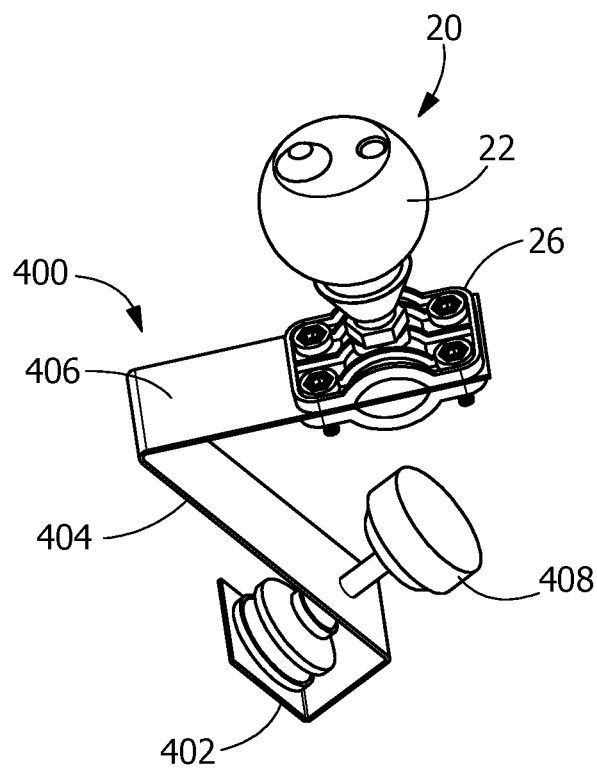
FIG. 7 depicts the sensor assembly component of the disclosed obstacle detection and avoidance system mounted on a second example implementation of a positioning clamp.

FIG. 1 provides a semi-exploded view of the sensor assembly component of an example implementation of the disclosed obstacle detection and avoidance system; and FIG. 2 is a top perspective view of the sensor assembly component of FIG. 1. FIG. 3 provides a simplified schematic depicting an example implementation of the disclosed obstacle avoidance and detection system detailing various components and certain functional aspects of the system and FIG. 4 depicts the sensory assembly component of the disclosed obstacle detection and avoidance system mounted outside a vehicle and communicating with the processing component of the system which is underneath the hood of the vehicle (not shown), wherein the processing component is wirelessly communicating information to the operator of the vehicle using application software resident on a mobile device. FIG. 5 provides a block diagram illustrating the various heights measured and calculated by an example implementation of the disclosed obstacle detection and avoidance system and FIG. 6 depicts the sensor assembly component of the disclosed obstacle detection and avoidance system mounted on a first example implementation of a positioning clamp; and FIG. 7 depicts the sensor assembly component of the disclosed obstacle detection and avoidance system mounted on a second example implementation of a positioning clamp.

As best shown in FIGS. 1-2, an example implementation of the disclosed obstacle detection and avoidance system includes sensor assembly 20 which is in electrical communication with processor 90 using wired connectivity. Sensor assembly 20 further includes sensor body 22, which houses sensor 23 and level 24. Holding nut 25 connects sensor body 22 to sensor base 26, which includes top clamping portion 27 and bottom clamping portion 29. Top gasket 28 and bottom gasket 30 are included in sensor base 26 for purposes of stabilizing sensor assembly 20 when it is mounted on the exterior of a vehicle. Bolts 31 and washers and nuts 32 are used to attach sensor base 26 to a substrate. In some implementations, sensor 23 is an ultrasonic sensor (preferably an ultrasonic transducer) that provides ultrasonic generation and ultrasonic reception, and that may include temperature compensation module 40.

Ultrasonic sensors are known as transducers when they both send and receive signals and work on a principle similar to radar or sonar, which evaluates attributes of a target by interpreting the echoes from radio or sound waves respectively. Ultrasonic sensors generate high frequency sound waves and evaluate the echo which is received back by the sensor. Sensors calculate the time interval between sending the signal and receiving the echo to determine the distance to an object. Systems typically use a transducer which generates sound waves in the ultrasonic range, above 20,000 hertz, by turning electrical energy into sound, then upon receiving the echo turn the sound waves into electrical energy which can be measured and displayed. Ultrasonic transducers send and receive sound waves for many types of sensing. Examples include distance, proximity, level, nondestructive evaluation, web break detection, counting, and security applications. They typically operate at their resonant frequency with various construction options, beam patterns, and power levels.

Ultrasonic transducers are available in various types for different applications and many such transducers are compatible with the present invention. For example, plain general-purpose transducers, including air transducers, are available with no specialized features. More specialized styles are common as well, such as contact transducers for placement directly on the surface to be measured. Dual element transducers have two elements in the transducer housing and allow the transmitter and receiver to operate independently. The elements are angled toward each other to create a reflective transmit/receive pathway. Angle beam transducers include mounted transparent angle blocks and are often used for weld inspection and flaw detection. They typically utilize refracted shear waves to detect flaws throughout the depth of welded areas. Submersible transducers are designed to be totally submerged in a liquid medium, most often fresh water. A protected element style protects the transducer element for use on rough surfaces. Delay line transducers are versatile, often with replaceable head options such as membranes and wear caps. Such transducers are used to gage or detect flaws such as delamination in thin materials. Shear wave transducers introduce shear waves into material without using an angle beam wedge. The ratio of shear wave components to longitudinal components can exceed 30 dB. Medical style transducers and housings are designed for specific medical applications and are also widely commercially available.

Common features available for ultrasonic transducers include (i) array configurations for connecting multiple transducers in series or parallel; (ii) temperature compensation circuitry that compensates for sensitivities changing with ambient temperature; and (iii) optional analog output. Most transducers output analog voltage, but may have provisions for current loop output, etc. Ultrasonic transducers that are potentially compatible with the present invention may be obtained from a variety of commercial sources such as Maxbotics (EZ0-4), Robotic Electronics/Devantech (SRF10, SRF08, SRF04, and SR235), Idec (SAGA), ASL/Seiz & Viscarret (Usonic), and Sonaswitch (MiniA and MiniS). A variety of other ultrasonic devices are potentially compatible with the disclosed obstacle detection and avoidance system.

As best shown in FIG. 3, processor 90 is mounted within the vehicle, typically under the vehicle's hood, and includes Bluetooth and/or other wireless communications capabilities and global positioning system (GPS) capabilities. Processor 90 may be or may include a printed circuit board (PCB) that includes signal amplifier 24, signal comparator 44, and control and display logic 64 functionality, in addition to other desired functionality. Power is supplied to processor 90 by vehicle power 80. In the implementation shown in FIG. 3, processor 90 produces two separate, but not mutually exclusive output options.

In the first option, processor 90 utilizes a controller area network system (CAN bus) and the J1939-RP1226 protocol (i.e., Society of Automotive Engineers standard SAE J1939) at 100 to communicate with the original equipment manufacturer (OEM) in-cab dashboard display and, in some implementations, interface with collision avoidance systems (CAS) at 102 to apply the vehicle's brakes at 104 if an overhead obstacle is too low for safe clearance. Examples of collision avoidance systems that are potentially compatible with the disclosed obstacle detection and avoidance system include Wingman Fusion (Bendix); Detroit Assurance (Daimler); and On Guard (Wabco), all of which are forward collision mitigation systems (e.g., detecting and avoiding collisions with vehicles that are in front of the vehicle possessing the sensor).

In the second option, processor 90 utilizes Bluetooth wireless communication or other wireless communication at 200 to communicate with a smartphone or other mobile device on which application software specific to the disclosed obstacle detection and avoidance system has been loaded and is operating. This application software may be referred to as the GiraffeG4 app and it is used to warn the driver of a vehicle if an obstacle is too low for safe clearance. The GPS capability included in processor 90 may be used to mark the location and height of an overhead obstacle and then communicate such information to other fleet members, or store such information on the smartphone using the GiraffeG4 app.

With reference to FIG. 5, the disclosed obstacle detection and avoidance system may be used according to the following example method. Using sensor base 26, sensor assembly 20 is mounted on the exterior of a vehicle in a location that allows sensor 23 to have a clear and unobstructed view (i.e., no impediments or blockages 45° from vertical). No portion of the vehicle on which sensor assembly 20 is mounted should block the signal path of sensor 23. Sensor assembly 20 is then connected to processor 90 which is wirelessly connected to either the vehicle's OEM in-cab dashboard display or a smartphone, tablet, or other mobile device. The height above ground level 100 at which sensor 23 (sensor surface level 104) is mounted is measured (e.g., manually) to determine reference height 106. Reference height 106 is then manually entered into processor 90. The tallest portion above ground level 100 of the vehicle in which the obstacle detection and avoidance system is installed is measured (e.g., manually or reference to printed height on vehicle or owner's manual) and entered into processor 90. As the vehicle slowly moves under an overhead item (i.e., a potential obstacle), sensor 23 is used to measure the overhead distance between the bottom of the overhead obstacle and the sensor itself. This distance is referred to as measured distance 110, which is then stored in processor 90. Processor 90 is then used to calculate a measured height 108 of the obstacle, which is displayed on the vehicle's OEM in-cab dashboard display or a smartphone, tablet, or other mobile device. Measured height 108 is reference height 106 added to measured distance 110. A visual and/or audible alarm is produced if the measured height 108 of the overhead obstacle is less than the height of the tallest portion (e.g., the trailer or portion of the vehicle behind the cab) of the vehicle above ground level 100.

In this manner, the operator of a vehicle in which the disclosed obstacle detection and avoidance system has been installed may avoid a collision with an overhead obstacle that is lower than the maximum height of the vehicle. In an example implementation, the obstacle detection and avoidance system remains active while the cab portion of the vehicle passes completely under the overhead item and automatically shuts off when the potential obstacle has been cleared. The disclosed obstacle avoidance and detection system is typically always on. Once the operator has activated the system, the system will remain on until the operator turns the system off. The system will not display measured heights until the system detects a solid obstacle that needs to be measured. Once the obstacle has been cleared, the system will continue displaying the last measurement for 90 seconds and then stop displaying a number on the in-cab display or mobile device. The obstacle and display system then remains on until the next needed measurement. In another example implementation, an audio alarm output produces an alarm and a light flashes if the height read by sensor 23 is lower than reference height 106. For example, if the height programmed into the unit is 13'0" and the actual height of the obstacle is displayed as 13'1", LED 62 will show a constant 13'1". If LED 62 reads 13'0" or below, the readout will blink on and off and the alarm will sound.

In one implementation, when the disclosed obstacle detection and avoidance system detects an overhead obstacle, the height of which is lower than the height of the tallest portion above ground level 100 of the vehicle in which the obstacle detection and avoidance system is installed, the visual and audible alarms sound and the system locks into the lower height. Upon locking into the lower height, the sensor stops taking measurements until the obstacle has been cleared and the unit has been manually reset by the user or until after a preprogrammed time delay (e.g., 3-4 seconds) has passed. Preventing the obstacle avoidance system from automatically resetting and beginning to take new overhead distance measurements provides a driver or operator with more time to become aware of a potentially dangerous overhead obstacle and respond accordingly. In this and other embodiments, the volume of the audible warning can be set to a level that allows it to be easily heard over the engine sound generated by the vehicle when being driven.

FIG. 7 depicts the sensor assembly component of the disclosed obstacle detection and avoidance system mounted on a first example implementation of a positioning clamp; and FIG. 8 depicts the sensor assembly component of the disclosed obstacle detection and avoidance system mounted on a second example implementation of a positioning clamp. As shown in FIG. 7, sensor 20 is mounted on positioning clamp 300 using sensor base 26. Clamp 300 includes contoured base portion 302, vertical riser portion 304, downwardly-angled top portion 306, first tightening device 308, and second tightening device 310, both which cooperate with the geometry of base portion 302 to attach the entire sensor assembly to a substrate at an angle most conducive to proper positioning of sensor 20. As shown in FIG. 8, sensor 20 is mounted on positioning clamp 400 using sensor base 26. Clamp 400 includes contoured base portion 402, vertical riser portion 404, downwardly-angled top portion 406, and tightening device 408, which cooperates with the geometry of base portion 402 to attach the entire sensor assembly to a substrate at an angle most conducive to proper positioning of sensor 20. Clamps 300 and 400 permit sensor 20 to be mounted on different types of vehicles.

Various embodiments provide methods for using the described system for preventing the collision of a vehicle with an overhead obstacle. An example method includes mounting at least one sensor on a vehicle, wherein the vehicle includes a vehicle control system, wherein the at least one sensor is in electrical communication with at least one processor, and wherein the at least one processor is accessible by an operator of the vehicle; determining a reference height, wherein the reference height is the height above ground level at which the at least one sensor is mounted on the vehicle; inputting the reference height into the at least one processor; determining the height of the tallest portion of the vehicle above ground level; inputting the height of the tallest portion of the vehicle above ground level into the at least one processor; using the at least one sensor to measure the overhead distance between the lowest portion of an obstacle and the at least one sensor; using the at least one processor to determine a measured height of the overhead obstacle, wherein the measured height of the overhead obstacle is the reference height added to the distance between the overhead obstacle and the at least one sensor; communicating an alarm message to the operator of the vehicle if the measured height of the overhead obstacle is less than the height of the tallest portion of the vehicle above ground level; and communicating an alarm message to the operator of the vehicle and/or to the vehicle control system if the measured height of the overhead obstacle is less than the height of the tallest portion of the vehicle above ground level.

In an alternate implementation not shown in the Figures, the sensor used is a radar-based sensor. An example of this type of obstacle detection and avoidance system includes a sensor assembly, which is in electrical communication with a processor, which further includes LED display or other type of display, including wireless communication devices. The processor is in electrical communication with a vehicle controller and is powered through the vehicle's internal power distribution system. With regard to providing power to the obstacle detection and avoidance system, in other implementations power is supplied through a diagnostics connector, cigarette lighter connector, or other port or connector that is in electrical communication a source of electrical power within the vehicle. The source of electrical power may be integrated into the vehicle's electronics or may be external thereto (e.g., a separate external battery). The processor is in electrical communication with the vehicle controller though an optional controller area network (CAN) connection. A radar transceiver and antenna are in communication with radar reception and radar generation. Power is provided through power control, which draws power from the vehicle itself. Signal processing and signal discrimination are both provided. The signal is processed using control logic, display logic, and communications logic. Regarding the processed signal, in an Option 1, through a first communications link, signal output is displayed on a visual display and audio output in the form of an alarm occurs. Regarding the processed signal, in an Option 2, through a second communications link, signal output is direct to the vehicle controller such that the vehicle automatically stops or takes some other action intended to avoid a collision. In some versions, radar-based sensors communicate with the processor using the J1939 protocol (i.e., Society of Automotive Engineers standard SAE J1939), for automatic application of the brakes on a vehicle when an overhead obstacle is detected. Certain versions of the disclosed system and method provide connectivity across a fleet or group of vehicles. Accordingly, if a driver determines the height of a particular obstacle, relevant data may be wirelessly sent to and saved on a network server that is accessible by other drivers who may encounter the same obstacle at a later time.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" if used in this specification, are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept.

What is claimed:

1. A method for preventing collision of a vehicle with an overhead obstacle, comprising:
   (a) mounting at least one sensor on the vehicle, wherein the vehicle includes a vehicle control system, and wherein the at least one sensor is in electrical communication with at least one processor located within the vehicle and powered by the vehicle;
   (b) determining a reference height, wherein the reference height is the height above ground level at which the at least one sensor is mounted on the vehicle;
   (c) inputting the reference height into the at least one processor;
   (d) determining the height of a tallest portion of the vehicle above ground level;
   (e) inputting the height of the tallest portion of the vehicle above ground level into the at least one processor;
   (f) using the at least one sensor to measure an overhead distance between a lowest portion of an obstacle and the at least one sensor;
   (g) using the at least one processor to determine a measured height of the overhead obstacle, wherein the measured height of the overhead obstacle is the reference height added to the distance between the overhead obstacle and the at least one sensor; and
   (h) communicating an alarm message to an operator of the vehicle if the measured height of the overhead obstacle is less than the height of the tallest portion of the vehicle above ground level, wherein the alarm message is communicated to the operator using application software resident on a mobile device that is in communication with the processor, using an original equipment manufacturer in-cab touch screen dashboard display that is in communication with the processor, or both.

2. The method of claim 1, further comprising including a global positioning system in the at least one processor.

3. The method of claim 2, further comprising using the global positioning system to mark a location and height of the overhead obstacle and then using a server in communication with the global positioning system to communicate the location and height of the overhead obstacle to other vehicles that are in communication with the server.

4. The method of claim 1, further comprising using a controller area network system (CAN bus) and J1939 protocol to enable communication between the processor and the vehicle control system.

5. The method of claim 1, wherein the at least one sensor is either an ultrasonic sensor or a radar-based sensor.

6. The method of claim 1, wherein the vehicle is a truck, a semi-trailer truck, a recreational vehicle, a bus, a tall work van, or an ambulance.

7. The method of claim 1, wherein the alarm message is audible, visual, or both audible and visual.

8. A method for preventing a collision of a vehicle with an overhead obstacle, comprising:
   (a) mounting at least one sensor on the vehicle, wherein the vehicle includes a vehicle control system, and wherein the at least one sensor is in electrical communication with at least one processor located within the vehicle and powered by the vehicle, and wherein the at least one processor includes a global positioning system;
   (b) determining a reference height, wherein the reference height is the height above ground level at which the at least one sensor is mounted on the vehicle;
   (c) inputting the reference height into the at least one processor;
   (d) determining the height of a tallest portion of the vehicle above ground level;
   (e) inputting the height of the tallest portion of the vehicle above ground level into the at least one processor;
   (f) using the at least one sensor to measure an overhead distance between a lowest portion of an obstacle and the at least one sensor; and
   (g) using the at least one processor to determine a measured height of the overhead obstacle, wherein the measured height of the overhead obstacle is the reference height added to the distance between the overhead obstacle and the at least one sensor.

9. The method of claim 8, further comprising using the global positioning system to mark a location and height of the overhead obstacle and then using a server in communication with the global positioning system to communicate the location and height of the overhead obstacle to other vehicles that are in communication with the server.

10. The method of claim 8, further comprising communicating an alarm message to the operator of the vehicle if the measured height of the overhead obstacle is less than the height of the tallest portion of the vehicle above ground level, wherein the alarm message is communicated to the operator using application software resident on a mobile device that is in communication with the processer, using an original equipment manufacturer in-cab touch screen dashboard display that is in communication with the processor, or both.

11. The method of claim 10, wherein the alarm message is audible, visual, or both audible and visual.

12. The method of claim 8, further comprising using a controller area network system (CAN bus) and J1939 protocol to enable communication between the processor and the vehicle control system.

13. The method of claim 8, wherein the at least one sensor is either an ultrasonic sensor or a radar-based sensor.

14. The method of claim 8, wherein the vehicle is a truck, a semi-trailer truck, a recreational vehicle, a bus, a tall work van, or an ambulance.

15. A method for preventing a collision of a vehicle with an overhead obstacle, comprising:
   (a) mounting at least one sensor on the vehicle, wherein the vehicle includes a vehicle control system, wherein the at least one sensor is in electrical communication with at least one processor, wherein the at least one processor is accessible by an operator of the vehicle, and wherein the at least one processor includes a global positioning system;
   (b) determining a reference height, wherein the reference height is the height above ground level at which the at least one sensor is mounted on the vehicle;
   (c) inputting the reference height into the at least one processor;
   (d) determining the height of a tallest portion of the vehicle above ground level;
   (e) inputting the height of the tallest portion of the vehicle above ground level into the at least one processor;
   (f) using the at least one sensor to measure an overhead distance between a lowest portion of an obstacle and the at least one sensor;
   (g) using the at least one processor to determine a measured height of the overhead obstacle, wherein the measured height of the overhead obstacle is the reference height added to the distance between the overhead obstacle and the at least one sensor; and
   (h) communicating an alarm message to the operator of the vehicle if the measured height of the overhead obstacle is less than the height of the tallest portion of the vehicle above ground level, wherein the alarm message is communicated to the operator using application software resident on a mobile device that is in communication with the processor, using an original equipment manufacturer in-cab touch screen dashboard display that is in communication with the processor, or both.

16. The method of claim 15, further comprising using the global positioning system to mark a location and height of the overhead obstacle and then using a server in communication with the global positioning system to communicate the location and height of the overhead obstacle to other vehicles that are in communication with the server.

17. The method of claim 15, further comprising using a controller area network system (CAN bus) and J1939 protocol to enable communication between the processor and the vehicle control system.

18. The method of claim 15, wherein the alarm message communicated to the operator is audible, visual, or both audible and visual.

19. The method of claim 15, wherein the at least one sensor is either an ultrasonic sensor or a radar-based sensor.

20. The method of claim 15, wherein the vehicle is a truck, a semi-trailer truck, a recreational vehicle, a bus, a tall work van, or an ambulance.

* * * * *